US007793583B2

(12) United States Patent
Radinger et al.

(10) Patent No.: US 7,793,583 B2
(45) Date of Patent: Sep. 14, 2010

(54) MECHANICAL TAPPET IN PARTICULAR FOR A FUEL PUMP OF AN INTERNAL COMBUSTION ENGINE

(75) Inventors: Norbert Radinger, Nuremberg (DE); Manfred Jansen, Weisendorf (DE); Stefan Dorn, Hollfeld (DE); Norbert Geyer, Hochstadt (DE); Karsten Kucht, Wilhermsdorf (DE)

(73) Assignee: Schaeffler KG, Herzogenaurach (DE)

(*) Notice: Subject to any disclaimer, the term of this patent is extended or adjusted under 35 U.S.C. 154(b) by 365 days.

(21) Appl. No.: 11/944,741

(22) Filed: Nov. 26, 2007

(65) Prior Publication Data

US 2008/0190237 A1 Aug. 14, 2008

Related U.S. Application Data

(60) Provisional application No. 60/887,258, filed on Jan. 30, 2007, provisional application No. 60/868,774, filed on Dec. 6, 2006.

(51) Int. Cl.
*F16J 1/10* (2006.01)
*F16J 15/18* (2006.01)
*F16H 53/06* (2006.01)

(52) U.S. Cl. ........................ 92/129; 92/165 PR; 74/569

(58) Field of Classification Search .................. 92/129, 92/153, 165 PR; 74/569; 123/90.48

See application file for complete search history.

(56) References Cited

U.S. PATENT DOCUMENTS

| | | | | |
|---|---|---|---|---|
| 4,807,575 | A * | 2/1989 | Litwinchuk et al. | 123/90.55 |
| 5,327,860 | A * | 7/1994 | Kruger | 74/569 |
| 5,676,098 | A * | 10/1997 | Cecur | 123/90.5 |
| 6,289,765 | B1 * | 9/2001 | Clayson, III | 74/569 |
| 7,497,157 | B2 * | 3/2009 | Aoki et al. | 92/129 |
| 2005/0120989 | A1 * | 6/2005 | Geyer et al. | 123/90.59 |

FOREIGN PATENT DOCUMENTS

| | | |
|---|---|---|
| DE | 19729793 | 1/1999 |
| DE | 10345089 | 4/2005 |

* cited by examiner

*Primary Examiner*—Michael Leslie
(74) *Attorney, Agent, or Firm*—Volpe and Koenig, PC

(57) ABSTRACT

A mechanical tappet (101, 201, 301, 401, 501, 601, 701, 801, 901, 1001) is provided, in particular for actuating the lifting of a pump piston (39) of a fuel pump of an internal combustion engine, with a sleeve-shaped tappet housing (102, 202, 302, 402, 502, 602, 702, 902, 1002) constructed as a shaped sheet-metal part and with a driving roller (6) supported so that it can rotate. Here, a bolt (4) supports the driving roller so that it is centered, and end sections (7) of the bolt projecting from the driving roller are supported in bolt eyes (8) of the tappet housing.

24 Claims, 10 Drawing Sheets

MECHANICAL TAPPET IN PARTICULAR FOR A FUEL PUMP OF AN INTERNAL COMBUSTION ENGINE

CROSS-REFERENCE TO RELATED APPLICATIONS

This application claims the benefit of U.S. Provisional Applications 60/868,774, filed Dec. 6, 2006 and 60/887,258, filed Jan. 30, 2007, which are incorporated herein by reference as if fully set forth.

BACKGROUND

The invention relates to a mechanical tappet, especially for actuating the lifting of a pump piston of a fuel pump in an internal combustion engine. The tappet has a sleeve-shaped tappet housing, which is constructed as a shaped sheet-metal part and which is supported in a tappet guide with an essentially cylindrical outer casing surface, and a driving roller supported so that it can rotate, as well as a stroke-transmission component, which is produced separately from the tappet housing and which is inserted into the tappet housing and which has a driven-side contact surface for the pump piston.

A tappet of this type is know from DE 103 45 089 A1. The tappet provided there is used as an actuating element of a known high-pressure fuel pump for the transverse force-free transmission of a cam stroke to the pump piston and features a sleeve-shaped tappet housing constructed as a shaped sheet-metal part. This housing has, in comparison with most extruded tappet housings of such roller tappets, both a high potential for lightweight construction and also a significant potential for cost savings. Someone skilled in the art can point out these advantageous properties immediately through a comparison of the tappet provided in the cited publication with a tappet as is known from DE 197 29 793 A1 with an extruded and consequently relatively thick-walled tappet housing.

The tappet in the publication noted first above nevertheless features a few serious disadvantages in connection with the driving roller. These include, essentially, that the driving roller is supported non-centered in the stroke-transmission component inserted in the tappet housing and slides accordingly with its peripheral surface in a corresponding recess of the stroke-transmission component. As is known, such a support of the driving roller, however, is extraordinarily difficult to align, because a certain rotation of the driving roller can be guaranteed only when the contact friction between the cam and the driving roller is always greater than the contact friction between the driving roller and the stroke-transmission component under all operating conditions of the internal combustion engine or the fuel pump. If corresponding alignment of the contact partners is not possible, then the stoppage of the driving roller at least at some times and counteracting the actual goal of reducing the friction must be taken into account with the correspondingly high risk of contact wear relative to the cam and/or the stroke-transmission component. In addition, for such a non-centered support of the driving roller in the stroke-transmission component, corresponding precautions must be taken for captive mounting of the driving roller on the tappet.

SUMMARY

The present invention is therefore based on the objective of refining a tappet of the type named above, such that the mentioned disadvantages are eliminated with simple means. Accordingly, the tappet should have not only a high potential for lightweight construction and cost savings, but should also require the lowest possible driving power for simultaneously best possible operating reliability in terms of the driving roller.

The solution to meeting this objective is provided by the invention, while advantageous refinements and constructions of the invention can be taken from the description and claims that follow. Accordingly, a bolt supported centered to the driving roller and selectively by means of roller bodies should be provided, wherein end sections of the bolt projecting from the driving roller are supported in bolt eyes of the tappet housing.

Therefore, because a tappet housing that can be produced cost-effectively as a light-weight construction and as a shaped sheet-metal part is used and simultaneously the driving roller is, contrary to the cited state of the art, no longer eccentrically supported on its extent in the stroke-transmission component, but instead centered by the bolt supported in the tappet housing, the tappet can be produced both with an especially light-weight construction and also cost-effectively and also features a rolling contact against the driving cam that considerably reduces the necessary driving power and that is reliable in operation. The bolt supporting the roller which is supported, for its part, in the bolt eyes, is used simultaneously as expense-neutral captive mounting for the driving roller on the tappet.

With regard to the term "shaped sheet-metal part," it should be mentioned explicitly at this point that the tappet housing can be shaped not only from a sheet-metal billet, but instead also from sheet-like semi-finished products, such as, for example, thin-walled tubes—independent of whether it has a longitudinal seam or not.

In a refinement of the invention, the stroke-transmission component should be produced as a punched or fabricated part made from sheet-metal material. The stroke-transmission component produced from sheet-metal material is not only the basis for an extensive reduction of the production costs of the tappet, but instead can also differ from the tappet housing in terms of the material selection to the extent that the sheet-metal materials used for these two components are optimized to their different functional requirements, optionally also with suitable surface coatings. Alternatively, however, a stroke-transmission component is also possible, which is produced by another known production method, for example, extrusion, casting, sintering, or plastic injection molding with material selection based on the functional requirements, heat treatment, and/or surface treatment.

In addition, it is provided that the tappet housing has a double-wall construction in the region of the bolt eyes, wherein the bolt eyes are arranged in brackets of the tappet housing, with these brackets being bent into this housing running parallel to the outer casing surface of the tappet housing. A tappet housing constructed in this way is especially advantageous when this has a completely cylindrical outer casing surface and the bolt is fixed in place through a positive-fit connection of one of its ends in the bolt eyes. This is because, in this case, deformation of the brackets caused by the fixing process has no effect or only a slight effect on the cylindrical shape of the tappet housing necessary for guidance in the tappet guide.

Furthermore, the tappet housing should have a recess, in which a rotation-locking body projecting radially past the outer casing surface of the tappet housing is used for aligning the driving roller in the tappet guide and consequently for the parallel alignment of the driving roller relative to the cam.

As an alternative to a completely cylindrical tappet housing, it can also be provided that the tappet housing has flat sections in a region of the bolt eyes that are set back relative to the cylindrical shape. Here, it can be preferably for shaping reasons to cut the flat sections locally relative to the cylindrical outer casing surface, so that the flat sections each stand back, forming an essentially sickle-shaped gap in the tappet housing.

Moreover, the stroke-transmission component should be constructed as an insert plate supported on axial shoulders of the tappet housing in the direction of the driving roller, wherein the axial shoulders are formed on an inner casing surface of the tappet housing by the flat sections. A stroke-transmission component constructed in this way can be produced cost-effectively, particularly as a stamped part from sheet-metal material with corresponding edge-layer hardening by the stamping.

Furthermore, an insert plate produced as a precision-stamped part is especially suitable for expanding the function of cost-savings because the rotation-locking body aligning the tappet in its tappet guide is formed by a projection shaped in one piece on the insert plate and guided through the recess of the tappet housing.

It is also provided that the insert plate has a flat construction and is supported with two opposing, circular segment-shaped support sections on the axial shoulders. While the circular segment-shaped support sections are used for the secure support of the insert plate on the axial shoulders, openings relative to the inner casing surface of the tappet housing are formed for the purpose of ventilation and oil return during the operation of the tappet by sections lying in-between and deviating from the circular-segment shape.

Alternatively, the insert plate can be shaped like a box, so that the insert plate is supported on the axial shoulders with two ribs extending raised on two opposing support sections and features two opposing reinforcement angles extending between the support sections.

Alternatively, the gain in stiffness achieved in this way relative to the flat insert plate can also be generated in that the insert plate has a trough-like shape and features an internal section with a U-shaped cross section enclosed by a flat frame section. Here, the frame section is supported with two opposing support sections on the axial shoulders, which are each constructed as straight-edge surfaces bordering the gap.

A similarly trough-shaped insert plate of high inherent stability, which is supported simultaneously with low contact pressure on the axial shoulders, can also be given in that the insert plate is supported with two opposing support sections with U-shaped cross sections on the axial shoulders, which are each constructed as an end surface with a curved edge essentially complementary to the U-shaped cross section and bordering the gap. In particular, alignment errors or inclined positions of the contact surfaces on the insert plate and the pump piston relative to each other caused by component tolerances and leading to high pressure edge supports can be compensated easily at least in the rotational direction of the insert plate.

Furthermore, the insert plate should be inserted with a positive fit in the tappet housing by means of a captive-mounting device extending on the inner casing surface of the tappet housing. For a first variant of the captive-mounting device, it is provided that this device includes a securing ring supporting the insert plate and also knob-like projections, which run on the inner casing surface of the tappet housing and which are produced preferably by stamping and on which the securing ring is supported. This variant represents not only another potential for production cost savings for the tappet by means of the extremely cost-effective securing ring, but also offers considerable play in the material selection essentially independent from each other for the insert plate and for the tappet housing due to the production and assembly sequence for the tappet, in which the finished insert plate is mounted into the similarly finished tappet housing only in a late production step. In addition, the positive-fit captive-mounting device also allows a slight tilting play of the insert plate in the tappet housing, so that alignment errors or inclined positions of the contact surface and the pump piston relative to each other similarly caused by component tolerances can be compensated.

An alternative captive-mounting device should include projections extending on the inner casing surface of the tappet housing and preferably fixed in place, as well as recesses formed in the insert plate, in which the projections engage. With respect to the production and assembly sequence of the tappet, the fixing of the projections preferably takes place when the tappet housing is in a soft state for an insert plate mounted therein. Alternatively, however, the projections can also be fixed when the tappet housing is in a hard state, wherein, there is again extensive play in the material selection for the insert plate and the tappet housing due to the late mounting of the insert plate in the tappet housing.

According to another preferred refinement of the invention, it can also be provided that the stroke-transmission component is constructed as a roller carrier supported on the bolt, with this carrier forming a U-shaped cross section in the direction of the bolt with a base part including the contact surface and with side parts angled in the direction of the bolt. Here, the end sections of the bolt are supported both in the bolt eyes of the tappet housing and also in bolt eyes of the side parts. In this respect, it can be especially advantageous when the bolt eyes of the tappet housing and/or the bolt eyes of the side parts are dimensioned relative to the bolt such that the roller carrier can pivot about the bolt or with the bolt in the tappet housing. First, through this arrangement, the force acting on the driving roller is divided into a longitudinal force component, which is transmitted via the bolt to the roller carrier and its contact surface to the pump piston, and into a transverse force component, which is transmitted via the bolt to the tappet housing and from this to the tappet guide. Accordingly, there is the possibility to shape the tappet housing so that it has especially thin walls and thus has an especially lightweight construction only under consideration of the transverse force component to be transmitted. Second, the pivoting suspension of the roller carrier on the bolt also allows an at least partial compensation of inclined positions or alignment errors of the contact surface and the pump piston relative to each other.

In a first variant of the roller carrier hinged on the bolt, it can be provided that the base part has an essentially flat construction, wherein the roller carrier has reinforcement angles extending from the base part perpendicular to the side parts. A similarly high inherent stability of the roller carrier can be generated alternatively in that the base part has a trough-shaped construction with a U-shaped cross-section perpendicular to the direction of the bolt.

Furthermore, in support of a large width of the driving roller with correspondingly high load rating or service life, the side parts should be guided through windows in the tappet housing and should surround the outsides of the flat sections, with the windows each being constructed in a transition section between the cylindrical shape and the flat sections.

In addition, the usability of the tappet shall not be limited to an activation element of a fuel pump, but instead should also extent to elements with a related function, such as is the case, for example, in mechanical tappets for activating gas-exchange valves of internal combustion engines. In this respect, it can be provided that the contact surface is constructed as a dome-shaped recess in the base part and is used, for example, for holding a tappet rod with a spherical end section moving with the gas-exchange valve.

In an especially preferred construction of the invention, it is further provided that the bolt is fixed in the bolt eyes in the axial direction with a positive fit with end sections expanded radially, wherein the bolt is hardened over its entire longitudinal extent with a core hardness of at least 56 HRC and the end sections are expanded by means of radial point rivets. Despite the high brittleness of the bolt also hardened in the region of its end sections, this can be shaped sufficiently by means of radial point rivets—a known method, which is explained in more detail in the scope of the description of the embodiments of the invention—with reference to the axial positive-fit fixing of the bolt in the bolt eyes. The completely hardened bolt requires, on one hand, only little expense for heat treatment and can be learned, for example, from the extremely cost-effective mass production of roller bodies. On the other hand, such a bolt can be fixed only or predominately with a positive fit, i.e., without or largely without the support of a press fit in the bolt eyes, without which its radially expanded end sections are subject to wear due to rotation of the bolt, as can be the case for a fixed bolt with end sections that are not hardened on the ends.

In addition, the radial point riveted bolt should be fixed in the bolt eyes only with a positive fit including axial play and/or radial play. Due to the lack of clamping forces acting axially on the bolt eyes between the end sections of the bolt, on one hand, and/or due to the lack of the radial force effect of a press fit on the bolt eyes, not only can a high inherent stability of the comparatively thin-walled tappet housing relative to an extruded part be guaranteed, but also, for the benefit of low production costs, a particular matching or surface quality of the bolt eyes can also be eliminated. In addition, the radial play allows the bolt to rotate in the bolt eyes for the benefit of its more uniform surface requirements in the region of the driving roller, so that, in this way, the reliability against surface wear in the contact region between the bolt and driving roller, including optional roller bodies, is further increased.

Moreover, it can be provided that the tappet housing has at least one injection borehole, which projects from a bead-like formation on the outer casing surface of the tappet housing and which runs perpendicular to the bore and which is directed toward the driving roller, for lubricating and cooling the driving roller.

Finally, it should be mentioned that the previously mentioned constructions of the invention could be combined arbitrarily with each other or also with other known features, as long as this is possible and useful.

BRIEF DESCRIPTION OF THE DRAWINGS

Additional features of the invention emerge from the following description and from the drawings, in which embodiments of the invention are shown. Unless indicated otherwise, leading digits of the reference numbers refer to the corresponding figures and are not included in the list of reference numbers. In addition, components or features that are identical or that are functionally identical are provided with identical reference numbers, unless indicated otherwise. Shown are.

DETAILED DESCRIPTION OF THE PREFERRED EMBODIMENTS

Figure 1A:
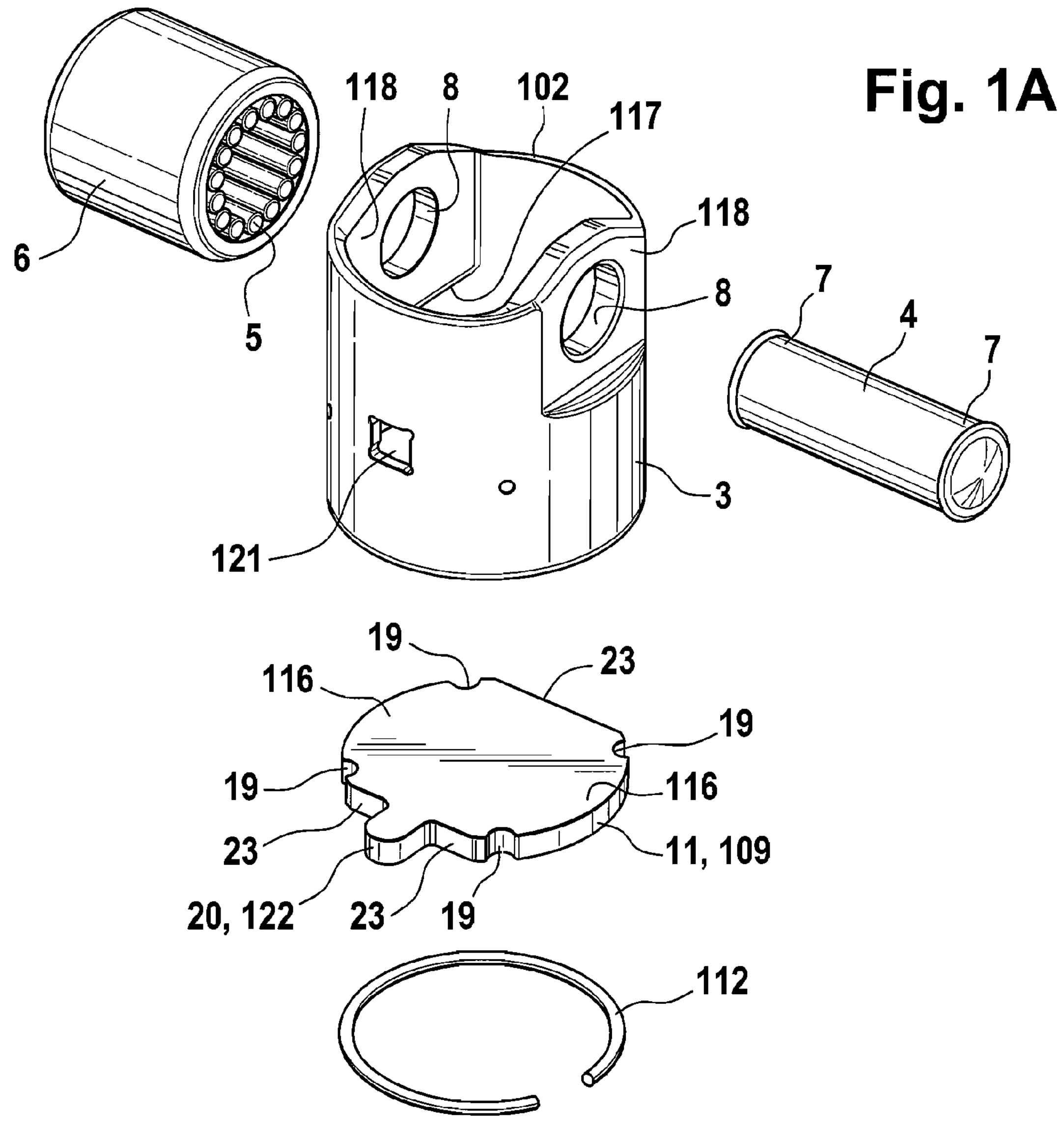
FIG. 1A a first embodiment of a tappet according to the invention with an insert plate in an exploded, perspective view.
Figure 1B:
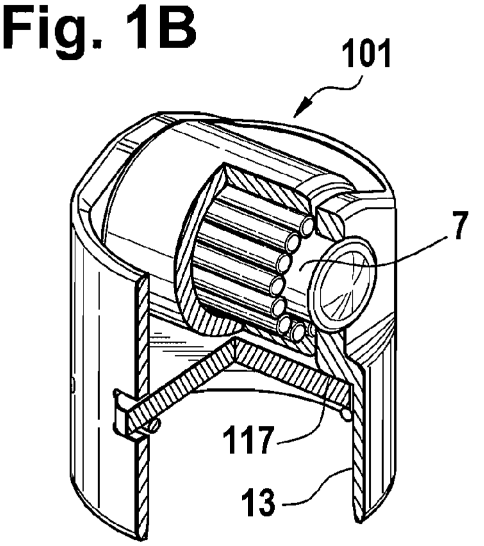
FIG. 1B the assembled tappet according to FIG. 1A in a perspective section view.
Figure 1C:
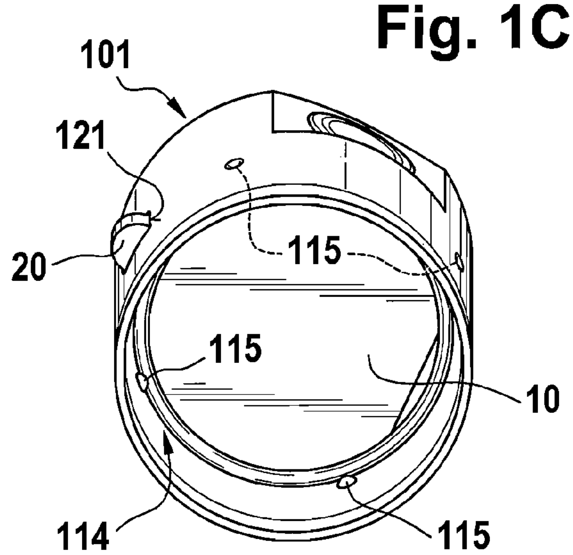
FIG. 1C the tappet according to FIG. 1B in a perspective, angled bottom view on the contact surface.
Figure 2A:
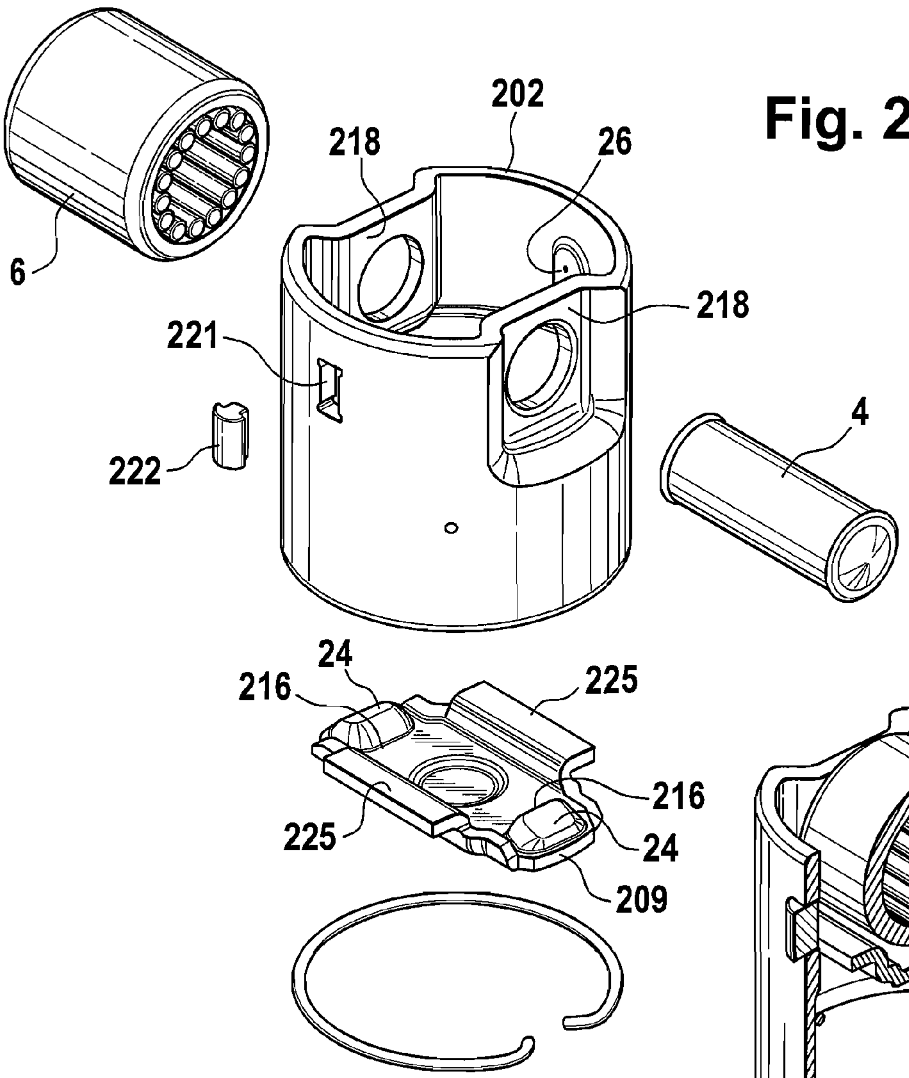
FIG. 2A a second embodiment of a tappet according to the invention with an insert plate in an exploded, perspective view.
Figure 2B:
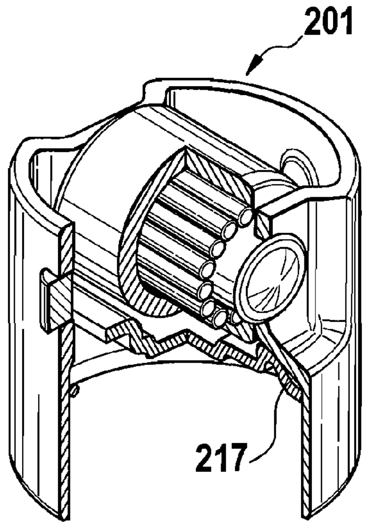
FIG. 2B the assembled tappet according to FIG. 2A in a perspective section view.
Figure 2C:
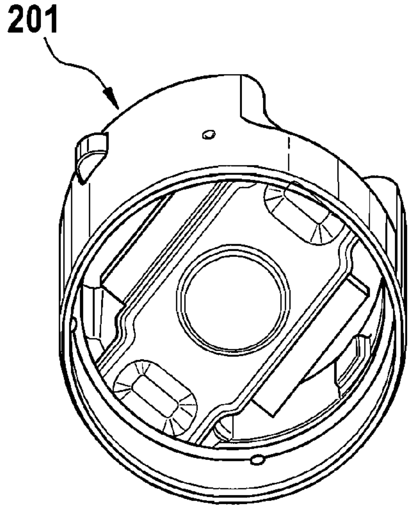
FIG. 2C the tappet according to FIG. 2B in a perspective, angled bottom view.
Figure 2D:
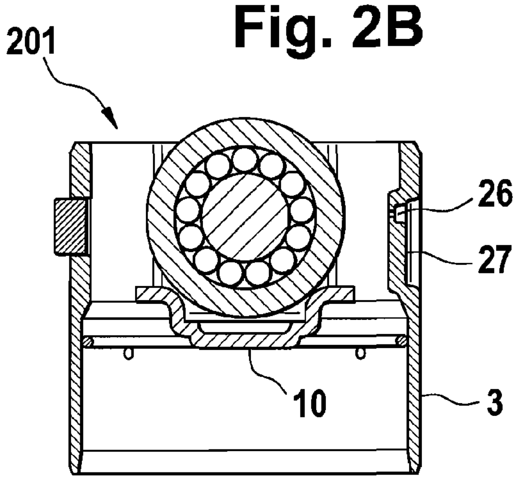
FIG. 2D the tappet according to FIG. 2B in a longitudinal section.

In FIGS. 1A to 1C, a mechanical tappet 101 is disclosed for actuating the lifting of a pump piston not shown here for a fuel pump of an internal combustion engine. The tappet 101 has a sleeve-shaped, thin-walled tappet housing 102, which is constructed as a deep-drawn, shaped sheet-metal part and which is supported with an essentially cylindrical outer casing surface 3 so that it can move longitudinally in a tappet guide of the fuel pump. A driving roller 6 supported on a bolt 4 via roller bodies 5 constructed here as needles is used as a low-friction counter surface for a similarly not-shown cam of a camshaft of an internal combustion engine, wherein end sections 7 of the bolt 4 projecting out of the driving roller 6 are supported in bolt eyes 8 of the tappet housing 102. For the axial, positive-fit fixing of the bolt 4 in the bolt eyes 8, its end sections 7 are radially expanded at the ends either through jamming or through the method of radial point riveting explained below.

The tappet 101 further has a stroke-transmission component 11 constructed as an insert plate 109 and with a driven-side contact surface 10 for the pump piston and also a securing ring 112 constructed as a snap ring as part of a captive-mounting device 114 extending on the inner casing surface 13 of the tappet housing 102, by which the insert plate 109 is fixed with a positive fit in the tappet housing 102. For this purpose, the captive-mounting device 114 includes, in addition to the securing ring 112, knob-like projections 115, which extend on the inner casing surface 13 of the tappet housing 102 and whose number here equals four and which are produced through stamping on the outer casing surface 3 of the tappet housing 102 and on which the insert plate 109 is supported by the securing ring 112 engaging below this insert plate.

The insert plate 109 produced as a flat precision stamped part is supported in the direction of the driving roller 6 with two opposing, circular segment-shaped support sections 116 on axial shoulders 117, which are formed on the inner casing surface 13 of the tappet housing 102 by flat sections 118 held back radially in the region of the bolt eyes 8 relative to the cylindrical shape. On the periphery of the insert plate 109, four recesses 19 can be seen, which are necessary for easily inserting the insert plate 109 into the tappet housing 102 relative to the projections 115. A projection 20, which is formed in one piece on the insert plate 109 and which is guided by a recess 121 of the tappet housing 102 and whose outer casing surface 3 projects radially, is used as a rotation-locking body 122 held by a complementary longitudinal groove of the tappet guide for radial alignment of the tappet 101 in the tappet guide for the purpose of parallel alignment of the driving roller 6 relative to the cam. Simultaneously, the insert plate 109 is also locked against rotation within the tappet housing 102 by the projection 20.

Moreover, the insert plate 109 is shaped with straight edges 23, so that sufficient overlap between the insert plate 109 and the inner casing surface 13 of the tappet housing 102 is always formed during the operation of the tappet 101 for ventilation and oil return or oil circulation—as is always the case, incidentally, also in the other embodiments of the invention.

A tappet designated with 201 with an insert plate 209 is disclosed in FIGS. 2A to 2D as a second embodiment of the invention. This embodiment differs, in comparison with the tappet 101 described above, essentially by the shape of the insert plate 209, which here has a box-shaped construction and is supported its with ribs 24 that extend raised from its support sections 216 against axial shoulders 217 of the tappet housing 202. The contact formed between the ribs 24 and the axial shoulders 217 acts, on one hand, as a rotation-locking device for the insert plate 209 in the tappet housing 202. On the other hand, the insert plate 209 has some radial play relative to the inner casing surface 13 of the tappet housing 202, so that radial displacement of the insert plate 209 in the direction of the bolt 4 due to the angled contact between the ribs 24 and the axial shoulders 217 leads to a slight pivoting of the contact surface 10. Consequently, this can be aligned on the pump piston so that component tolerance-related alignment errors or inclined positions between the pump piston and the contact surface 10 are compensated in the pivot plane. An essentially complete compensation of these alignment errors or inclined positions is also possible in that the contact surface 10 has a convex cylindrical shape at least in some sections in the direction of a connection line between the ribs 24, in order to also guarantee an edge-support free and low-pressure contact with the pump piston perpendicular to the pivoting direction of the insert plate 209.

Furthermore, high inherent stability of the insert plate 209 is given through two opposing reinforcement angles 225 running between the support sections 216, wherein a contact surface 10 formed raised in the direction of the pump piston on the insert plate 209 made as a fabricated part also contributes to its inherent stability.

The tappet 201 further differs from the tappet 101 in that here, a rotation-locking body 222 formed as a separate component is fixed in a recess 221 of the tappet housing 202. Another distinguishing feature, which, however, can also be provided optionally in all of the other embodiments, consists in an injection borehole 26 for lubricating and cooling the driving roller 6. The injection borehole 26 starts with a bead-like formation 27, which communicates with a lubricant supply channel in the tappet guide and is stamped on the outer casing surface 3 of the tappet housing 202—here—in the middle between flat sections 218, so that the injection borehole 26 extends perpendicular to the bolt 4 and is directed towards the driving roller 6.

Figure 3A:
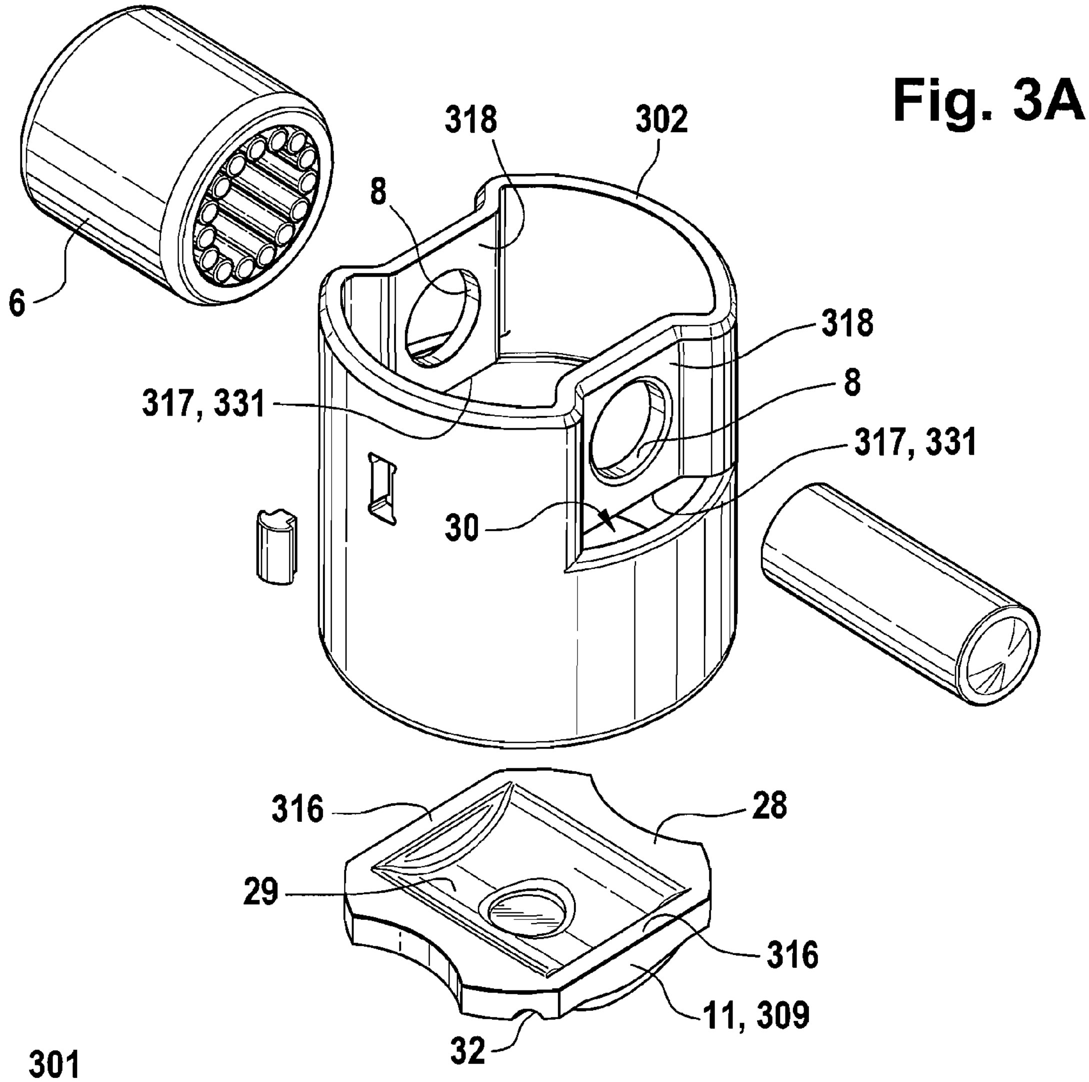
FIG. 3A the third embodiment of a tappet according to the invention with an insert plate in an exploded, perspective view.
Figure 3B:
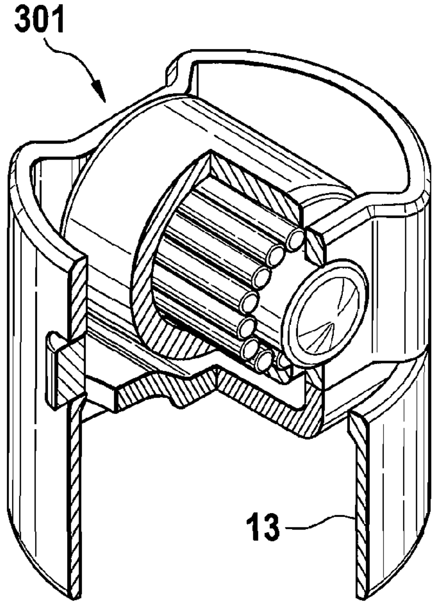
FIG. 3B the assembled tappet according to FIG. 3A in a perspective section view.
Figure 3C:
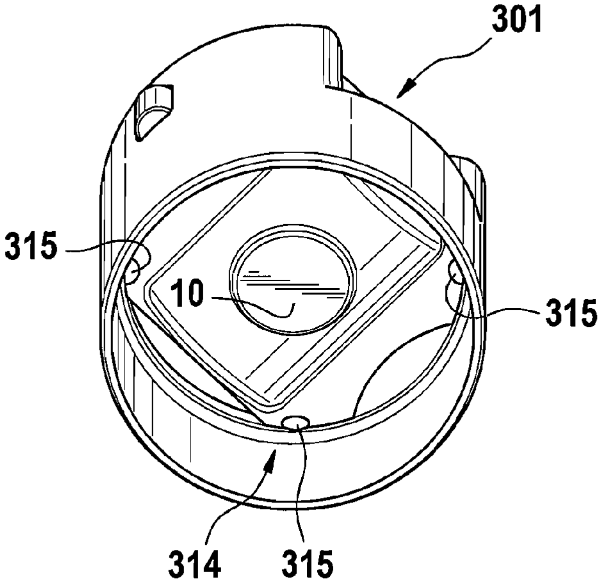
FIG. 3C the tappet according to FIG. 3B in a perspective, angled bottom view.

The stroke-transmission component 11 of a tappet 301 shown in FIGS. 3A to 3C is formed similar to an insert plate 309. This has a trough-shaped construction relative to the insert plate 209 and has an inner section 29 with a U-shaped cross section enclosed by a flat frame section 28 and with a contact surface 10, here raised likewise in the direction of the pump piston. In the region of the bolt eyes 8, flat sections 318 of a tappet housing 302 extend back, in this case in the radial direction relative to the cylindrical form so far that an essentially sickle-shaped gap 30 is formed in the tappet housing 302. This shape is realized preferably through local cutting of the tappet housing 302 during the sheet-metal shaping process, wherein axial shoulders 317 are produced in the form of straight-edged end surfaces 331 bordering the gap 30. The insert plate 309 is supported on these surfaces with opposing support sections 316 of the frame section 28 in the direction of the driving roller 6. In order to guarantee its support, which is nevertheless free from edge supports, on the end surfaces 331, under consideration of a load-related bending of the insert plate 309, these have a slightly convex construction in the radial inward direction.

Another distinguishing feature of the tappet 301 relates to its captive-mounting device 314 for the insert plate 309, which here includes projections 315 generated through local fixing on the inner casing surface 13 of the tappet housing 302 stepped in diameter and also a corresponding number of recesses 32 formed on the periphery of the insert plate 309, in which the projections 315 engage both in the axial and also radial directions with a positive fit. The fixing process for generating the projections 315 is performed preferably in the soft state of the tappet housing 302, so that for this type of captive-mounting device 314, a production and assembly sequence of the tappet 301 relative to the tappets 101 and 201 is necessary. Here, the insert plate 309 is to be mounted in the tappet housing before the heat treatment of this tappet housing 302 and is to be both hardened and also then ground together with the tappet housing 302.

Figure 4A:
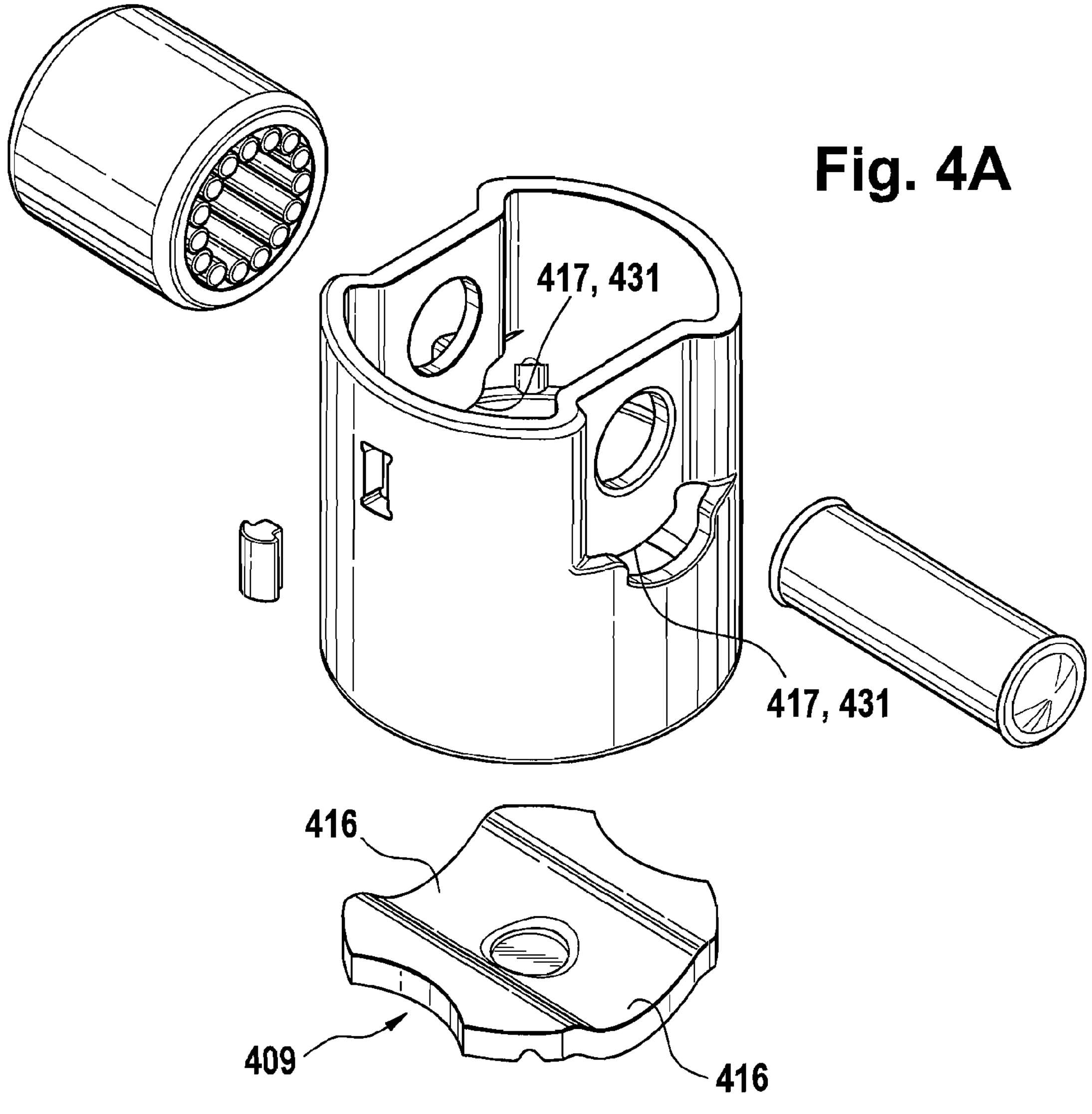
FIG. 4A a fourth embodiment of a tappet according to the invention with an insert plate in an exploded, perspective view.
Figure 4B:
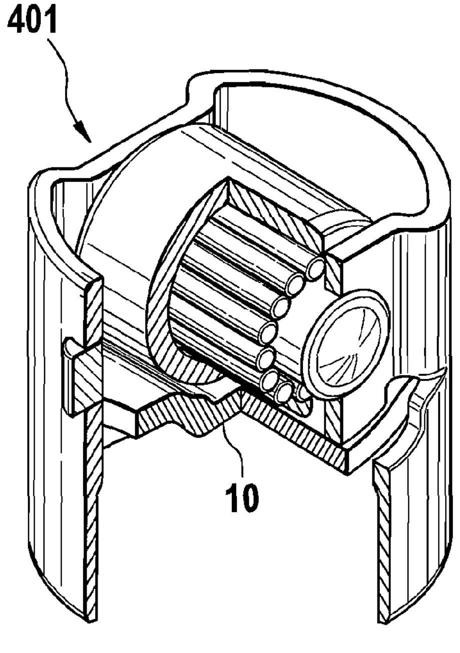
FIG. 4B the assembled tappet according to FIG. 4A in a perspective section view.

A tappet 401 shown in FIGS. 4A and 4B differs from the tappet 301 explained above in that an insert plate 409 here has a continuous trough-shaped construction, so that its opposing support sections 416 have a U-shaped cross section and are supported on essentially complementary arc-shaped axial shoulders 417 of a tappet housing 402 in the form of circular arc-shaped end surfaces 431. Good contact of the support sections 416 on the end surfaces 431 is achieved in that the end surfaces 431 are slightly more curved than the support sections 416. Instead of circular arc-shaped contact partners 416 and 431, it can also be provided that the U-shaped cross section of the support sections 416 can have a so-called gothic profile with two circular arcs offset at the center. In order to also guarantee here its support on the end surfaces 431 free from edge supports under consideration of a load-related bending of the insert plate 409, these also have a slightly convex construction in the radially inward direction. Component tolerance-related alignment errors or inclined positions between the pump piston and the contact surface 10 in the rotational plane can also be compensated by this support of the insert plate 409 corresponding to a pivot joint, in that the insert plate 409 is slightly twisted on the end surfaces 431. As explained above, an essentially complete compensation of these alignment errors or inclined positions is also possible in that the contact surface 10 has a convex cylindrical construction. Due to the rotational plane of the insert plane 409 extending, in this case, perpendicular to the bolt 4, however, the cylindrical form of the contact surface 10 is oriented orthogonal to the imaginary line connecting the support sections 416.

Figure 5A:
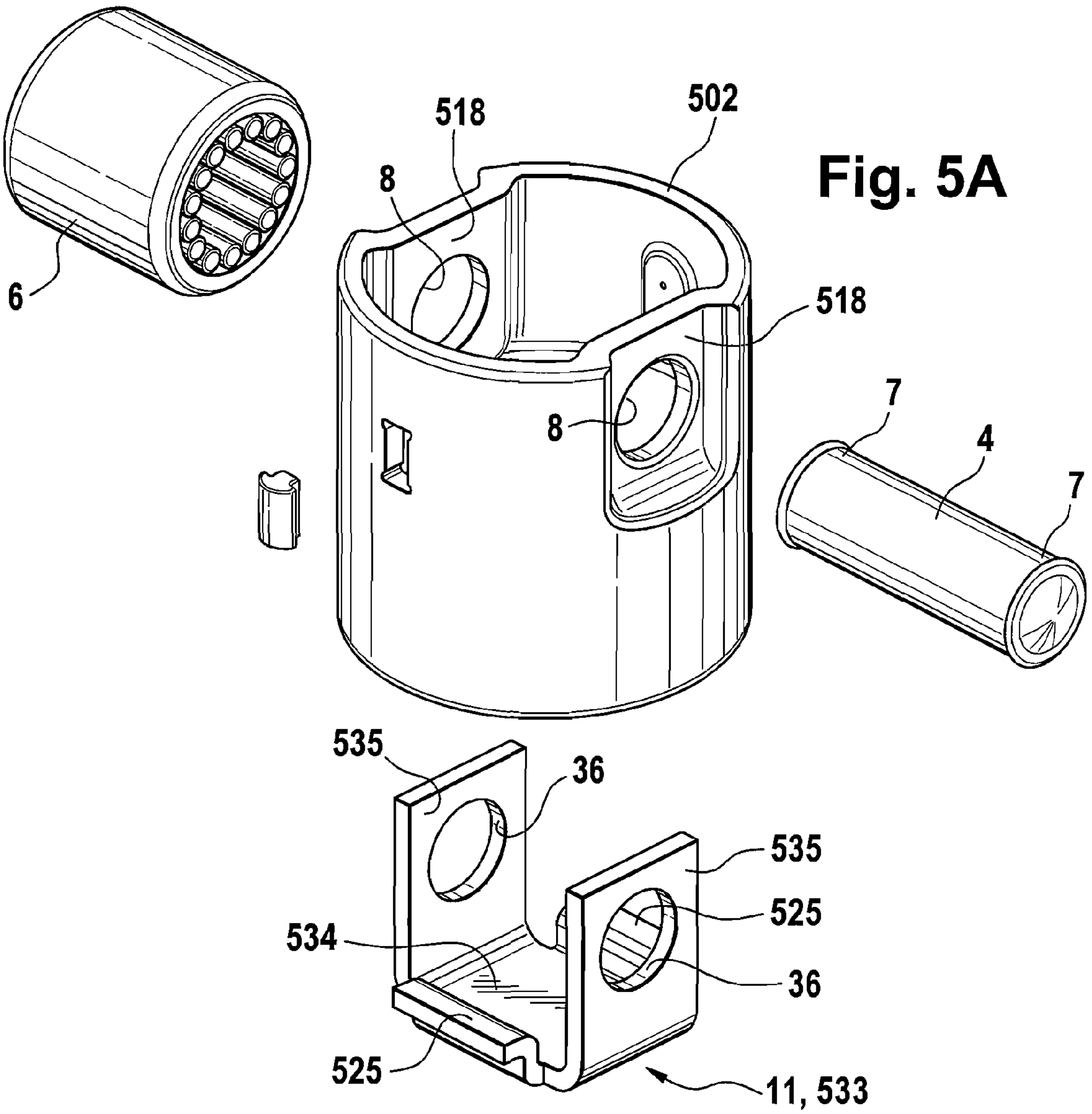
FIG. 5A a fifth embodiment of a tappet according to the invention with roller carrier in an exploded, perspective view.
Figure 5B:
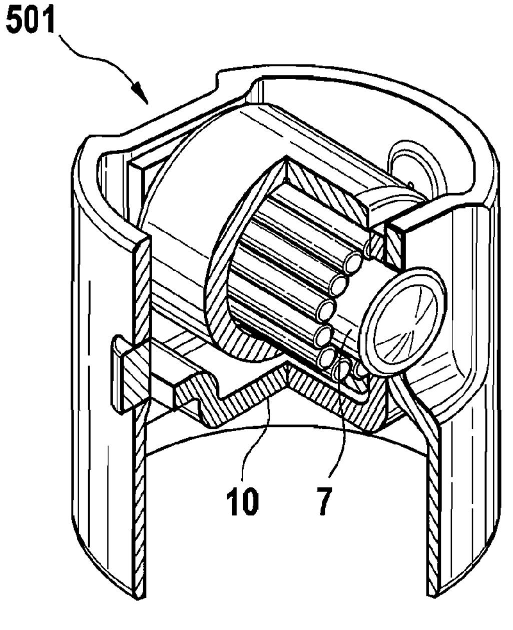
FIG. 5B the assembled tappet according to FIG. 5A in a perspective section view.

In FIGS. 5A and 5B, another tappet 501 according to the invention is disclosed. Instead of a stroke-transmission component 11 constructed as an insert plate, here this component is constructed as a roller carrier 533, which forms a U-shaped cross section in the direction of the bolt 4 with a base part 534, here flat, having the contact surface 10 and with side parts 535 angled away from the base part in the direction of the bolt 4. The roller carrier 533 is hinged on the bolt 4 via the bolt eyes 36 extending through the side parts 535, so that the end sections 7 of the bolt 4 are supported both in the bolt eyes 8 of a tappet housing 502 and also in the bolt eyes 36 of the side parts 535.

The bolt eyes 8 of the tappet housing 502 and/or the bolt eyes 36 of the side parts 535 are dimensioned relative to the bolt 4 so that the roller carrier 533 is inserted so that it can pivot about or with the bolt 4 in the tappet housing 502. Through this arrangement, the force of the cam acting on the driving roller 6 is divided into one longitudinal-force component, which is transmitted via the bolt 4 to the roller carrier 533 and its contact surface 10 onto the pump piston, and into a transverse-force component, which is transmitted via the bolt 4 to the tappet housing 502 and from this housing to the tappet guide. Accordingly, there is the possibility for the tappet housing 502 to have an especially thin-walled and thus particularly lightweight construction just under consideration of the transverse-force component to be transmitted. The inherent stability necessary for transmitting the longitudinal-force component in the roller carrier 533, which is produced from sheet-metal material as a fabricated part and consequently also has a low mass, can be generated in this embodiment in that it has reinforcement angles 525 extending from the flat base part 534 perpendicular to the side parts 535.

Figure 6A:
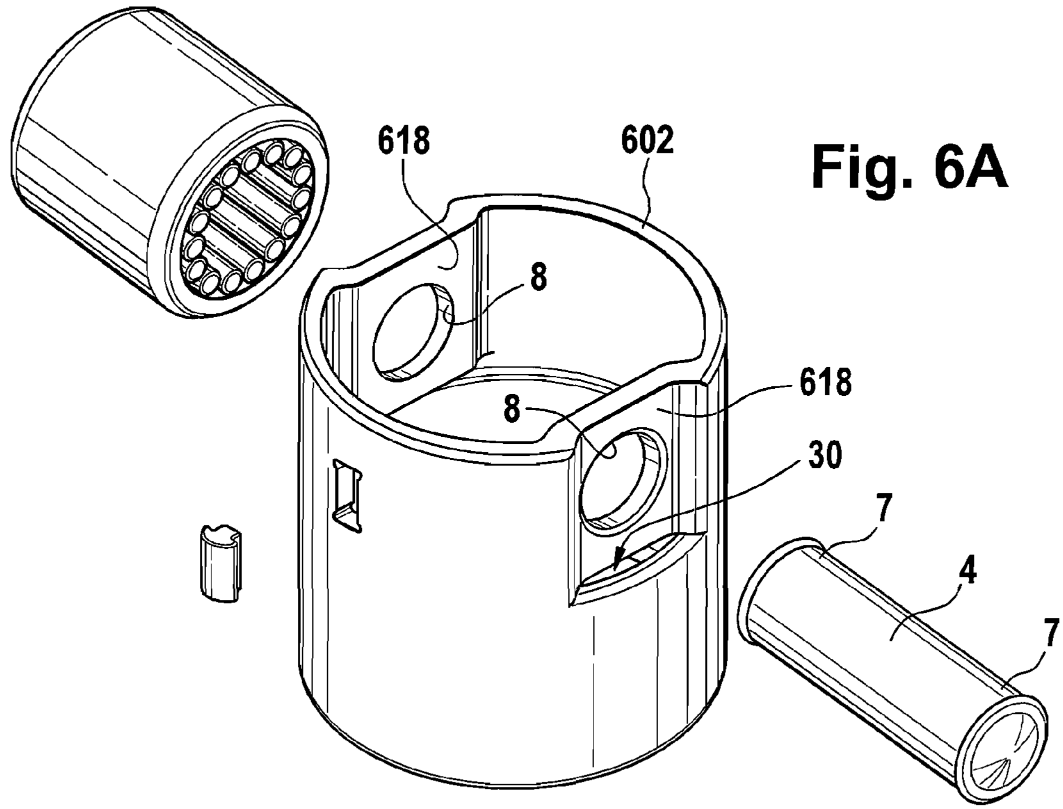
FIG. 6A a sixth embodiment of a tappet according to the invention with a roller carrier in an exploded, perspective view.
Figure 6B:
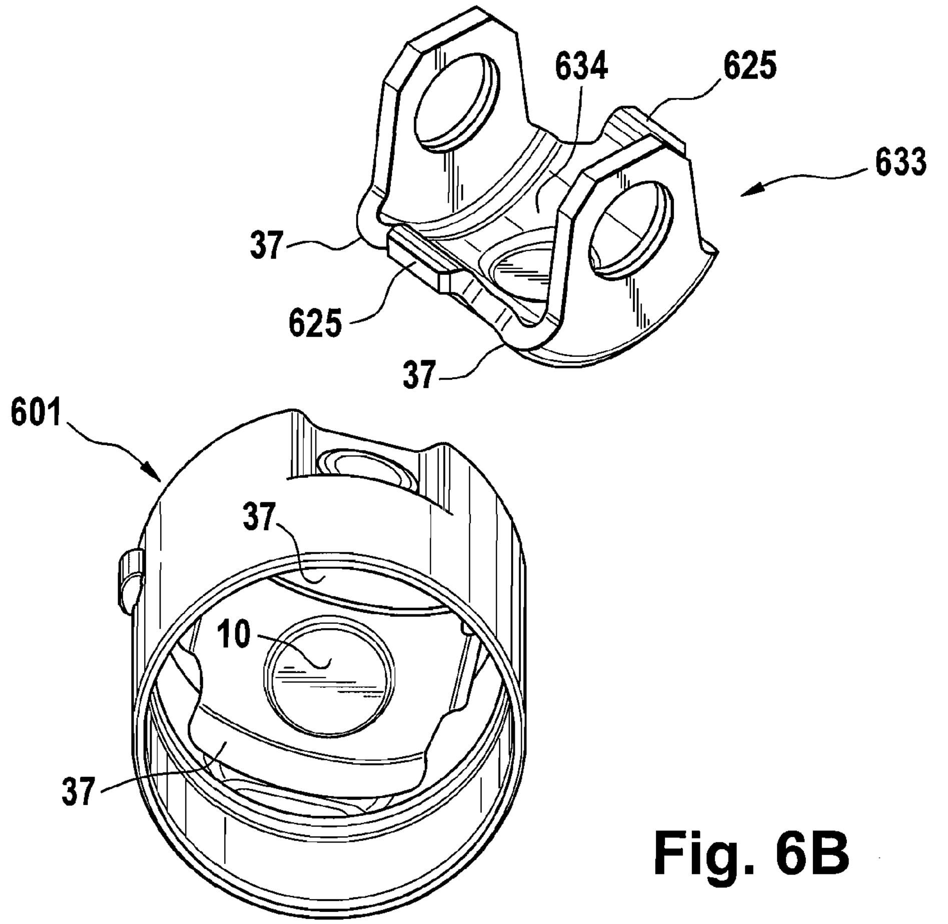
FIG. 6B the assembled tappet according to FIG. 6A in a perspective, angled bottom view.

Another embodiment of a tappet 601 according to the invention with a roller carrier 633 is shown in FIGS. 6A and 6B. In this case, the roller carrier 633 has a trough-shaped base part 634 with a U-shaped cross section perpendicular to the direction of the bolt 4. The inherent stability of the roller carrier 633 generated in this way is further increased by reinforcement angles 625 and also by ribs 37, which run parallel to the U-shape and on both sides of the contact surface 10 raised on the base part 634 in the direction of the pump piston. The tappets 501 and 601 are further distinguished in their construction of their tappet housing 502 or 602 in the way already explained above, according to which flat sections 618 of the tappet housing 602 extend back radially relative to the cylinder form resulting in the formation of the sickle-shaped gap 30, while the flat sections 518 of the tappet housing 502 are formed with a closed transitioning section to the cylinder form.

Figure 6C:
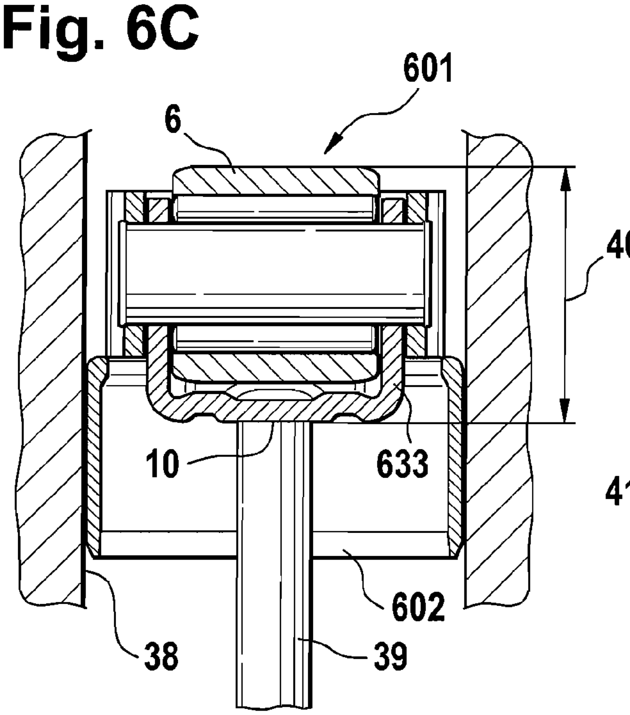
FIG. 6C a longitudinal section of the tappet according to FIG. 6B in an installed view.
Figure 7:
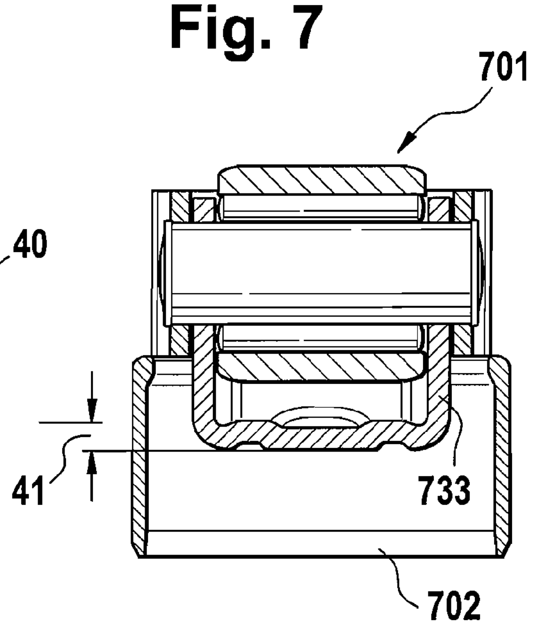
FIG. 7 a seventh embodiment of a tappet according to the invention with modified installation dimension in the longitudinal section.

The tappet guide already mentioned above and also the pump piston can be seen from the longitudinal section view of the tappet 601 according to FIG. 6C and designated with 38 or 39. By including FIGS. 7 and 8 with tappets 701 and 801, it becomes clear that the tappets with roller carriers have a high degree of flexibility with reference to a modular system, as illustrated below. If the tappet guides 38 permit the use of identical tappet housings 602 and 702, it is sufficient for generating a different installation dimension 40, i.e., the distance between the driving roller 6 and the contact surface 10, to use roller carriers 633 and 733 differing by an installation dimension 41. Conversely, the modular system allows, in the case of, for example, tappet guides 38 with different diameters but identical installation dimensions 40, the use of identical roller carriers 633 and 733 in tappet housings 602 and 702, which then differ from each other.

Figure 8:
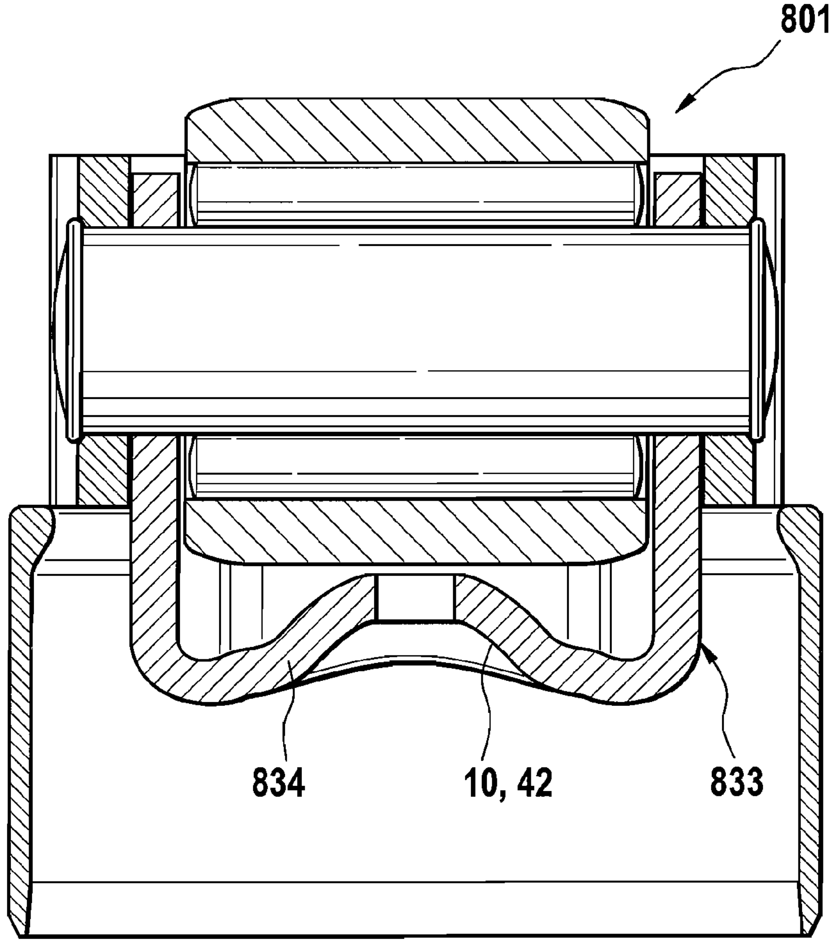
FIG. 8 an eighth embodiment of a tappet according to the invention with dome-shaped contact surface in the longitudinal section.

Another possibility opening up due to the modular system emerges from a tappet 801 shown in FIG. 8. This tappet has a roller carrier 833, whose contact surface 10 is here constructed as a dome-shaped recess 42 in a base part 834. Such a recess 42 is suitable, for example, for holding a pump piston with a spherical shape on one end or else also a tappet rod constructed spherically on one end for a gas-exchange valve drive.

Figure 9A:
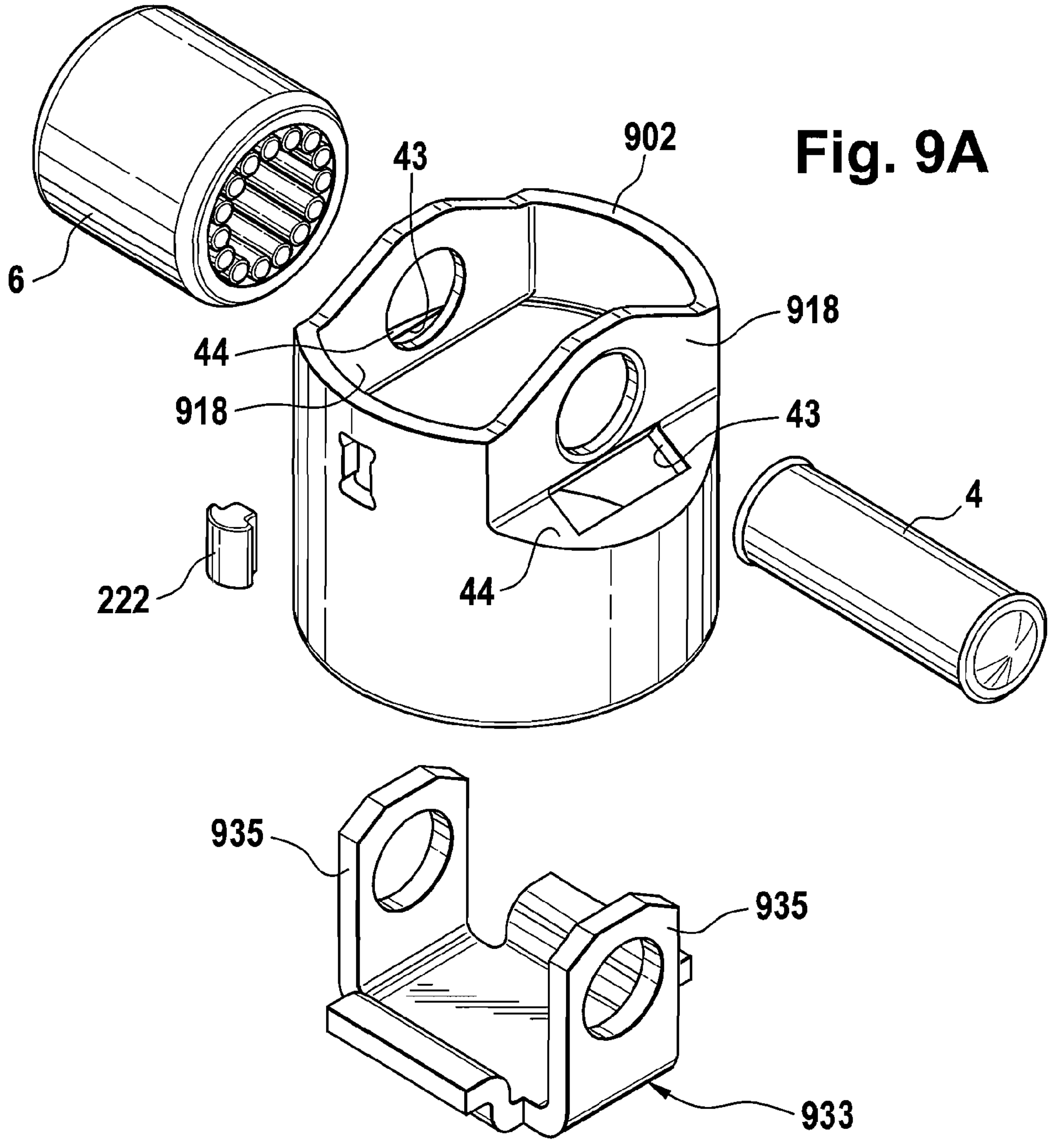
FIG. 9A a ninth embodiment of a tappet according to the invention with a roller carrier in an exploded, perspective view.
Figure 9B:
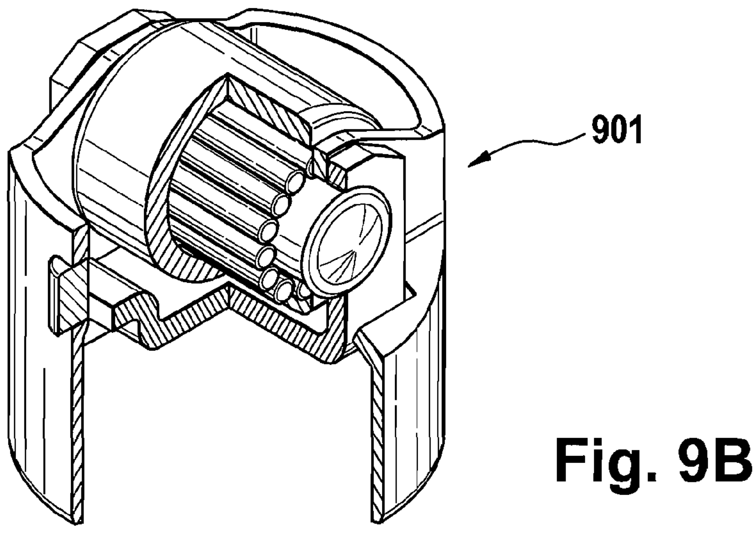
FIG. 9B the assembled tappet according to FIG. 9A in a perspective section view.
Figure 10A:
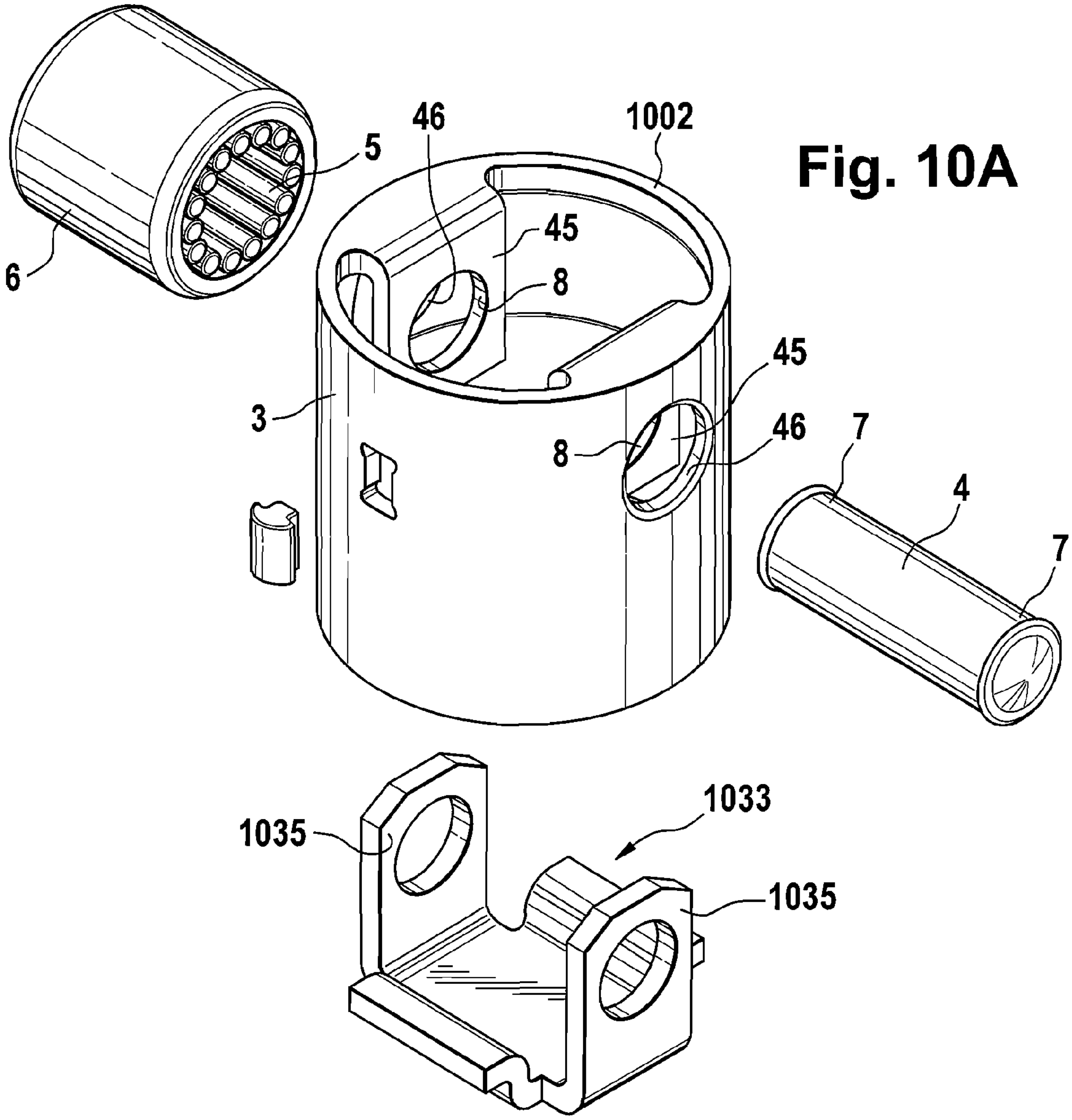
FIG. 10A a tenth embodiment of a tappet according to the invention with a roller carrier in an exploded, perspective view.
Figure 10B:
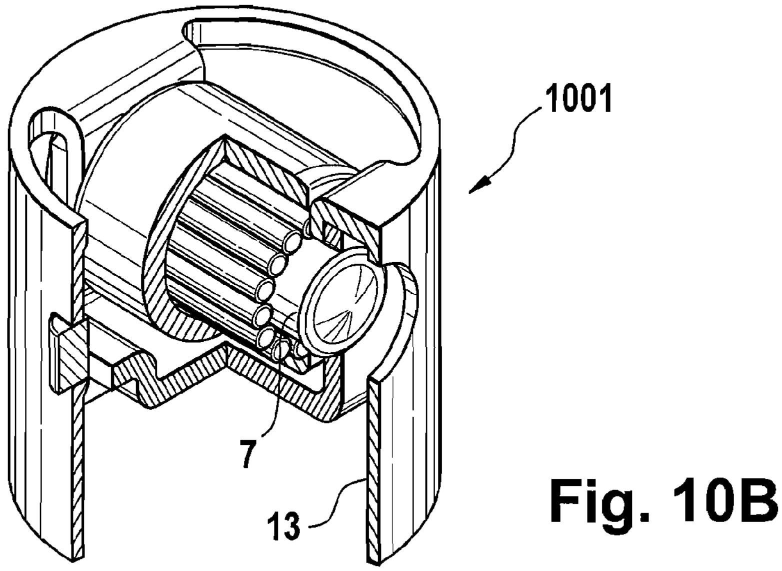
FIG. 10B the assembled tappet according to FIG. 10A in a perspective section view, and FIG. 11 the characteristic motion sequence of a radial point riveting tool in a schematic view.

Another embodiment of the invention is disclosed in FIGS. 9A and 9B with a tappet 901. The tappet 901 has a tappet housing 902 with windows 43, which are each formed in a transitioning section 44 between the cylinder form and flat sections 918 and through which side parts 935 of a roller carrier 933 are guided, so that the side parts 925 surround the flat sections 918 on the outside. Relative to the embodiments named above, there is a significant advantage in this arrangement in an increased space for installation for the width of the driving roller 6, whose load capacity or service life increases with the width. In particular, relative to the tappet housing 202 to 602, another advantage is also to be seen in the flat sections 918, which have a relatively large area and which must be sufficiently resistant to wear as an axial contact surface for the driving roller 6.

Another tappet 1001 according to the invention with roller carrier 1033 is disclosed in FIGS, 10A and 10B. The tappet 1001 has a tappet housing 1002, which has a double-walled construction in the region of the bolt eyes 8. For this purpose, the bolt eyes 8 are arranged in brackets 45, which are formed integrally in the tappet housing 1002 and which extend parallel to the outer casing surface 3 of the tappet housing 1002 after the inward bending. Side parts 1035 of the roller carrier 1033 surround the brackets 45 on the outside and consequently extend between the inner casing surface 13 of the tappet housing 1002 and the brackets 45. Alternatively, brackets can also be provided at a close distance to the inner casing surface 13 of the tappet housing 1002, so that the side parts of a modified roller carrier would then run on the inside of the brackets. Openings 46, which pass through the outer casing surface 3 of the tappet housing 1002 aligned with the bolt eyes 8, are used merely as mounting openings for inserting the bolt 4 and for pushing out a not-shown stopper for holding the roller body 5 in the not yet mounted driving roller 6 and also as access for a shaping tool, with which the end sections 7 of the mounted bolt 4 are expanded radially at the ends, in order to fix the bolt 4 in the bolt eyes 8 in the axial direction with a positive fit. This can be realized in all of the embodiments explained here both by known fixing processes and also by the known method of radial point riveting described below briefly.

The bolt 4 produced from roller bearing steel, such as 100Cr6, is hardened over its entire longitudinal extent and has a Rockwell hardness HRC of at least 58 corresponding to a Vickers hardness HV of at least 650. Despite the complete hardening and the associated brittleness of the bolt 4, its end sections 7 are essentially free of material spalling or fractures by use of the radial point riveting in the lens shape characteristic for this riveting method with convex spherical contours. This lens shape can be easily seen in the longitudinal section views of tappet 701 or 801.

Figure 11:
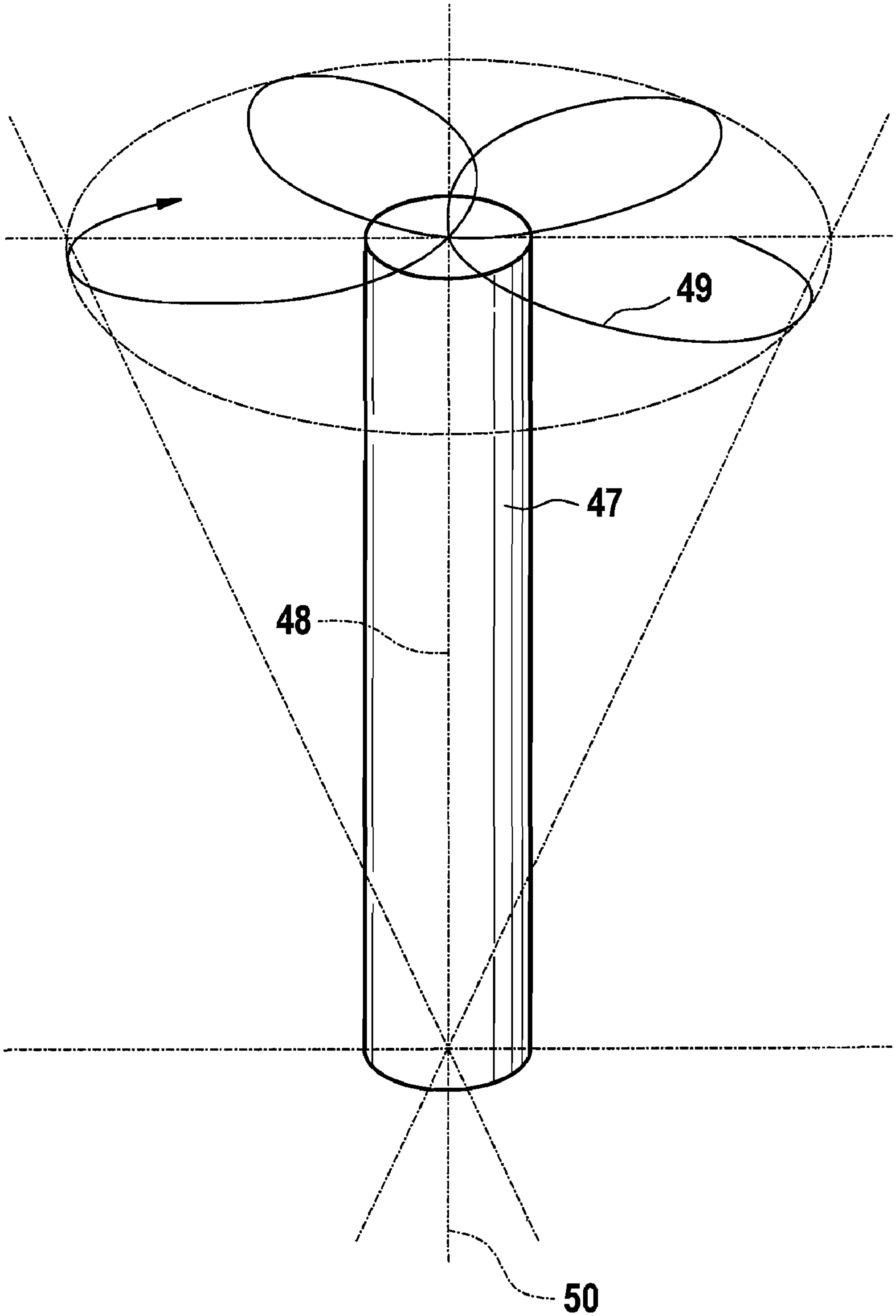

As is clear with reference to FIG. 11, the lens shape results from the spatial sequence of movements of a riveting punch 47 made from hard metal for a radial point riveting machine not shown in more detail. In this movement profile, the longitudinal axis 48 of the riveting punch 47 follows a cyclical looping path 49, whose envelope forms a circular cone tapering towards the workpiece, i.e., towards the bolt 4. Here, the longitudinal axis 48 of the riveting punch 47 passes through the center axis 50 of the circular cone again and again. Through the high-load contact between the end-side flat riveting punch 47 and the end sections 7 of the bolt 4, these sections are deformed radially at the ends successively.

Tests performed by the applicant have confirmed the basic suitability of this bolt fixing to a tappet corresponding to the tappet 601 shown in FIGS. 6A and 6B. The bolt 4 with a diameter of approximately 7.6 mm was produced from a roller bearing steel of the type 100Cr6 and hardened to a core hardness of approximately 60 HRC. The end-side deformation of the mounted bolt 4 was performed on a hydraulic radial point machine with flat riveting punch 12 (FIG. 11) at a riveting force of approximately 25 kN and a riveting time of approximately 2 sec. on both end sections 7. Subsequent measuring of the bolt 4 deformed in this way gave an expansion of the end sections 7 relative to the diameter of only approximately 0.1 mm. The fitting play of the bolt 4 in the bolt eyes 8 was selected to be large enough that the bolt 4 was fixed in the bolt eyes 8 both with noticeable axial play and also with slight radial play after the radial point riveting. Deformation of the thin-walled tappet housing 602 negatively affecting the necessary cylindrical shape due to joining tensions acting axially or radially on the bolt eyes 8 could be completely excluded in this way. In addition, the axial force necessary for pressing the bolt 4 from the bolt eyes 8—despite the comparatively low expansion of the end sections 7 of the bolt 4—was on average 2700 N at the level of reference components with bolts fixed at the ends.

LIST OF REFERENCE NUMBERS

1 Tappet
2 Tappet housing
3 Outer casing surface of tappet housing
4 Bolt
5 Roller body
6 Driving roller
7 End section of the bolt
8 Bolt eye
9 Insert plate
10 Contact surface
11 Stroke-transmission component
12 Retaining ring
13 Inner casing surface of tappet housing
14 Captive-mounting device
15 Projection on inner casing surface of tappet housing
16 Support section of insert plate
17 Axial shoulder
18 Flat section of tappet housing
19 Recess of insert plate
20 Projection of insert plate
21 Recess in tappet housing
22 Rotation-locking body
23 Edge of insert plate
24 Rib of support section
25 Reinforcement angle
26 Injection borehole
27 Bead-like formation
28 Frame section of insert plate
29 Inner section of insert plate
30 Sickle-shaped gap
31 End surface
32 Recess of insert plate
33 Roller carrier
34 Base plate of roller carrier
35 Side part of roller carrier
36 Bolt eye of side part
37 Rib of roller carrier
38 Tappet guide
39 Pump piston
40 Installation dimension of tappet
41 Differential installation dimension
42 Dome-shaped recess
43 Window in tappet housing
44 Transition section in tappet housing
45 Bracket of tappet housing
46 Opening of tappet housing
47 Riveting punch
48 Longitudinal axis of riveting punch
49 Looping path
50 Center axis

The invention claimed is:

1. Mechanical tappet for actuating lifting of a pump piston of a fuel pump of an internal combustion engine, the mechanical tappet comprising: a sleeve-shaped tappet housing which is constructed as a shaped sheet-metal part and which is supported with an essentially cylindrical outer casing surface in a tappet guide so that it can move longitudinally, and with a driving roller supported so that it can rotate, as well as with a stroke-transmission component, which is produced separate from the tappet housing and which is inserted into the tappet housing that has a driven-side contact surface for the pump piston, and the driving roller is centered and selectively supported via roller bodies on a bolt, with end sections of the bolt projecting from the driving roller are supported in bolt eyes of the tappet housing.

2. Tappet according to claim 1, wherein the stroke-transmission component is a stamped part or a fabricated part made from sheet-metal material.

3. Tappet according to claim 1, wherein the tappet housing has a double-walled construction in a region of the bolt eyes, and the bolt eyes are arranged in brackets of the tappet housing, the brackets are bent in the tappet housing and extend parallel to an outer casing surface of the tappet housing.

4. Tappet according to claim 1, wherein the tappet housing has a recess, in which a rotation-locking body that projects radially past the outer casing surface of the tappet housing is used for aligning the driving roller in the tappet guide.

5. Tappet according to claim 1, wherein the tappet housing has flat sections that extend inwardly in a region of the bolt eyes relative to the cylinder shape.

6. Tappet according to claim 5, wherein the flat sections each extend inwardly to form a generally sickle-shaped gap in the tappet housing.

7. Tappet according to claim 5, wherein the stroke-transmission component comprises an insert plate, which is supported on axial shoulders of the tappet housing in a direction of the driving roller, and the axial shoulders are formed on an inner casing surface of the tappet housing by the flat sections.

8. Tappet according to claim 7, wherein a rotation-locking body is formed by a projection formed integrally on the insert plate and guided by a recess of the tappet housing.

9. Tappet according to claim 7, wherein the insert plate has a flat construction and is supported with two opposing circular segment-shaped support sections on the axial shoulders.

10. Tappet according to claim 7, wherein the insert plate has a box-like construction and is supported with ribs that extend raised on two opposing support sections against the axial shoulders and two opposing reinforcement angles extending between the support sections.

11. Tappet according to claim 7, wherein the insert plate has a trough-shaped construction and has an inner section with a U-shaped cross section enclosed by a flat frame section, and the frame section is supported with two opposing support sections against the axial shoulders, which are each constructed as a straight-edged end face bordering a gap.

12. Tappet according to claim 7, wherein the insert plate has a trough-shaped construction and is supported with two opposing support sections each with a U-shaped cross section against the axial shoulders, which are each constructed as a curved end face, which is generally complementary to the U-shaped cross section and which borders a gap.

13. Tappet according to claim 7, wherein the insert plate is inserted with a positive fit in the tappet housing by a captive-mounting device extending from the inner casing surface of the tappet housing.

14. Tappet according to claim 13, wherein the captive-mounting device includes a retaining ring supporting the insert plate as well as knob-like stamped projections which extend on the inner casing surface of the tappet housing, the retaining ring is supported on the projections.

15. Tappet according to claim 13, wherein the captive-mounting device includes fixed projections produced that extend on the inner casing surface of the tappet housing, and recesses constructed in the insert plate, and the projections engage in the recesses.

16. Tappet according to claim 1, wherein the stroke-transmission component comprises a roller carrier supported on the bolt, wherein the roller carrier forms a U-shaped cross section in a direction of the bolt with a base part having the contact surface and with side parts angled away from the base part in the direction of the bolt, wherein the end sections bolt are supported both in the bolt eyes of the tappet housing and also in the bolt eyes of the side parts.

17. Tappet according to claim 16, wherein the bolt eyes of the tappet housing or the bolt eyes of the side parts are dimensioned relative to the bolt, such that the roller carrier is inserted so that it can pivot about or with the bolt in the tappet housing.

18. Tappet according to claim 16, wherein the base part has an essentially flat construction, wherein the roller carrier has reinforcement angles extending from the base part perpendicular to the side parts.

19. Tappet according to claim 16, wherein the base part has a trough-shaped construction with a U-shaped cross section perpendicular to the direction of the bolt.

20. Tappet according to claim 16, wherein the side parts are guided through windows in the tappet housing and surround outsides of flat sections in the tappet housing that extend inwardly in a region of the bolt eyes relative to the cylinder shape, the windows are each formed in a transition section between the cylindrical shape and the flat sections.

21. Tappet according to claim 16, wherein the contact surface is constructed as a dome-shaped recess in the base part.

22. Tappet according to claim 1, wherein the bolt is fixed in the bolt eyes with a positive fit in an axial direction with the end sections expanded radially at the ends, wherein the bolt is hardened over an entire longitudinal extent with a core hardness of at least 58 HRC and the end sections are expanded by radial point deformation.

23. Tappet according to claim 22, wherein the bolt is fixed with at least one of axial play or with radial play in the bolt eyes.

24. Tappet according to claim 1, wherein the tappet housing has at least one injection borehole in communication with an area of the tappet housing containing the driving roller, the at least one injection borehole starting from a bead-shaped formation on the outer casing surface of the tappet housing and extending perpendicular to the bolt and directed towards the driving roller.

* * * * *